March 26, 1940. W. K. PACY 2,195,282
VEHICLE DOOR CATCH MECHANISM
Filed Jan. 22, 1938
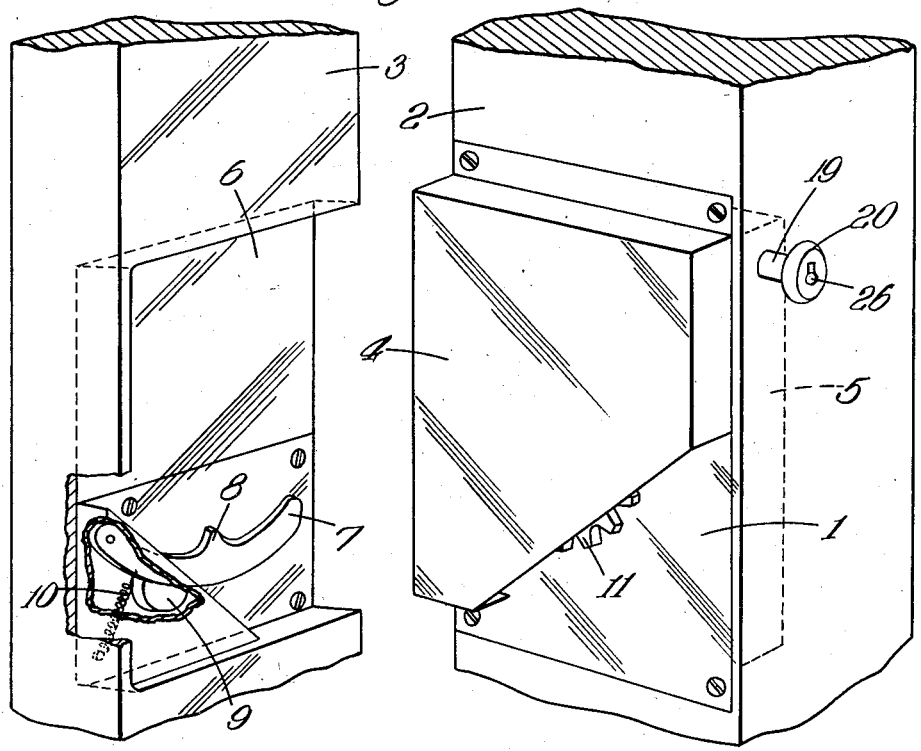
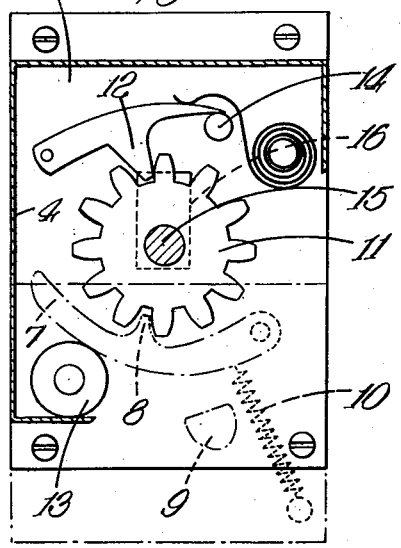
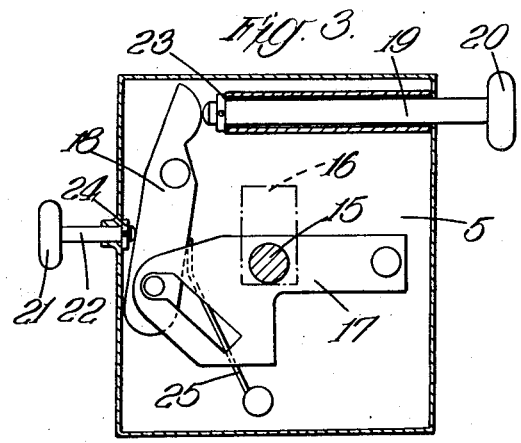
Walter Kenneth Pacy
INVENTOR
By [signature]
his ATT'Y.

Patented Mar. 26, 1940

2,195,282

UNITED STATES PATENT OFFICE 2,195,282

VEHICLE DOOR CATCH MECHANISM

Walter Kenneth Pacy, Aylesbury, England

Application January 22, 1938, Serial No. 186,262
In Great Britain October 19, 1937

1 Claim. (Cl. 292—280)

This invention relates to catch mechanism for retaining vehicle doors in the closed position, and has for its object to provide a mechanism of general utility which shall be of particular service for motor car and other vehicle doors in place of the pivoted handles and slam locks at present in use.

According to the invention vehicle door catch mechanism is adapted to be actuated to release the door for opening by manual operation of a press button or the like carried by the fixed frame or pillar of the door, spring or equivalent means preferably being provided which are stressed while the door is shut and act to give an opening impulse to the door when the latter is released.

Such mechanism avoids the use of the usual projecting door handles, which break the smooth surface of modern vehicle bodies, accumulate dirt, and are apt to constitute a danger to passers by.

Further features of the invention will be apparent from the following description and accompanying drawing, which refer to a constructional form of motor car door catch in accordance therewith.

Of the drawing:

Figure 1 is a perspective view showing the fittings carried by the door and the fixed vertical pillar respectively.

Figure 2 is a somewhat diagrammatic elevation of the external parts of the pillar fitting, the metal cover being removed, and Figure 3 is a similar view of the parts lying behind those of Figure 2.

As shown in Figure 1 a supporting plate 1 is screwed against the side of the pillar 2 facing the door 3. A generally rectangular cover 4, having the lower front corner cut away, shields the parts carried on the outer face of the plate 1, and the parts carried on the inner face thereof are enclosed in an inner box 5 sunk in the pillar 2.

The face of the door edge registering with the pillar 2 (shown as angularly displaced for clearness) is formed with a rectangular recess 6 adapted to fit over the cover 4 when the door is closed. The lower part of this recess accommodates a curved finger 7 pivotally mounted at its forward end and having an upward projection 8 midway along its upper concave edge. The finger 7 is held down against a rubber pad 9 by a tension spring 10 while the door is open.

Against the front face of the plate 1 (Figure 2) is a rotatable toothed wheel 11 prevented by a spring loaded pivot pawl 12 from rotating in the anti-clockwise direction. As the door is closed the free end of the finger 7 passes under the toothed wheel 11 and is raised by a hard rubber or fibre roller 13, so that the projection 8 engages the wheel 11 and rotates it by one tooth, the pawl 12 being raised and when dropping into place again to hold the door closed. A rubber or felt pad 14 is arranged to prevent the pawl 12 from "bottoming" between the teeth of the wheel 11, thereby avoiding the loud click characteristic of motor car doors.

The toothed wheel 11 is carried on a short spindle 15 passing rearwardly through an aperture 16 in the plate 1, and when the door is to be opened the spindle 15 is lifted bodily, and with it the wheel 11 and pawl 12, by means of the press button mechanism shown in Figure 3. The finger 7 is thus released, and the tension in the spring 10 makes it react against the roller 13 in such a way as to cause the door to spring ajar by six inches or more.

For this purpose the rear end of the spindle 15 is carried at an intermediate point in a horizontal pivoted lever 17, the free end of which has a pin and slot connection with the lower end of a vertical lever 18. The latter is pivoted at a point intermediate in its length and is adapted to be rocked in an anticlockwise sense, to raise the lever 17, by the stem 19 of a press button 20 carried on the outside of the pillar 2. In the drawings the button 20 is shown as projecting from the pillar 2 for the sake of clarity, but may well be sunk flush with the surface thereof for neatness and to guard against accidental depression.

A second push button 21 is provided inside the car and its stem 22 bears against the lever 18 below the pivot point of the latter so that the door may similarly be opened by an occupant of the car. The stems 19 and 22 slide in suitable cylindrical housings, and carry collars 23 and 24 near their free ends to prevent their becoming withdrawn.

The lever 18 is biased in a clockwise sense by a blade spring 25 so that the toothed wheel 11 returns to its lowest position when the press buttons are released, and it will be observed that the pin and slot connection between the levers 17 and 18 is such that the wheel 11 can be raised only by actuating a press button and is therefore bound to be turned by closing of the door.

The closed door may of course readily be locked for instance by applying to the exterior button a Yale lock mechanism (indicated at 26 in Figure 1) adapted to prevent it from being depressed.

I claim:

Catch mechanism for the hinged door of a vehicle, comprising in combination a toothed wheel carried by the fixed frame of said door, a guide element mounted on said frame in spaced relationship to said wheel, an arm having one end thereof pivoted to said door, said arm being provided with a cam surface on one side thereof and with a tooth projecting from the other side at a point intermediate the pivoted and the free end of the arm, a spring holding said arm normally in a position in which said cam surface is guided by said guide element when the door is shut to tilt the arm against the action of said spring to a position in which said tooth engages and rotates said wheel, a pawl engaging said wheel to prevent reverse rotation thereof, and a press-button device carried by the fixed frame of said door for moving said wheel bodily clear of said tooth to release the door, whereupon said cam surface under the action of said spring cooperates with said guide element to move the door ajar.

WALTER KENNETH PACY.